(12) United States Patent
Mohammad (10) Patent No.: US 8,723,963 B2
(45) Date of Patent: May 13, 2014

(54) DYNAMIC PRINT DRIVER INSTALLATION ON CAMERAS

(75) Inventor: Soiba Mohammad, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 1298 days.

(21) Appl. No.: 12/013,258

(22) Filed: Jan. 11, 2008

(65) Prior Publication Data

US 2009/0179991 A1    Jul. 16, 2009

(51) Int. Cl.
*H04N 5/225* (2006.01)

(52) U.S. Cl.
USPC ................................. 348/207.2; 348/207.1

(58) Field of Classification Search
USPC ................. 348/207.2, 207.99, 207.1, 207.11, 348/211.3, 211.5, 211.14, 211.1, 211.99
See application file for complete search history.

(56) References Cited

U.S. PATENT DOCUMENTS

| | | | |
|---|---|---|---|
| 5,580,177 A | 12/1996 | Gase | |
| 6,892,299 B2* | 5/2005 | Abe | 713/2 |
| 7,755,662 B2* | 7/2010 | Parulski et al. | 348/207.2 |
| 7,941,541 B2* | 5/2011 | Chang et al. | 709/227 |
| 2002/0129353 A1 | 9/2002 | Williams et al. | |
| 2003/0037325 A1 | 2/2003 | Hargrove et al. | |
| 2003/0135668 A1* | 7/2003 | Abe | 710/15 |
| 2003/0227554 A1 | 12/2003 | Kazami | |
| 2003/0227641 A1* | 12/2003 | Edmonds et al. | 358/1.13 |
| 2004/0162804 A1 | 8/2004 | Strittmatter | |
| 2004/0190042 A1* | 9/2004 | Ferlitsch et al. | 358/1.15 |
| 2004/0223182 A1* | 11/2004 | Minagawa | 358/1.15 |
| 2005/0066325 A1 | 3/2005 | Mori et al. | |
| 2005/0161510 A1* | 7/2005 | Kiiskinen | 235/472.01 |
| 2006/0092751 A1 | 5/2006 | Anderson | |
| 2007/0101345 A1 | 5/2007 | Takagi | |
| 2007/0123242 A1 | 5/2007 | Shapiro et al. | |
| 2007/0234354 A1 | 10/2007 | Hattori | |

FOREIGN PATENT DOCUMENTS

| | | | |
|---|---|---|---|
| JP | 2002268855 A | 9/2002 |
| JP | 2003032381 A | 1/2003 |
| JP | 2004334785 A | 11/2004 |
| JP | 2006155306 A | 6/2006 |

OTHER PUBLICATIONS

The Extended European Search Report for foreign patent application No. 09150303.7-2202, dated Mar. 13, 2009, 8 pages.
European Patent Office, "Office Action" in application No. 09 150 303.7-1902, dated May 14, 2013, 8 pages.

* cited by examiner

*Primary Examiner* — Ahmed A Berhan
(74) *Attorney, Agent, or Firm* — Hickman Palermo Truong Becker Bingham Wong LLP (57) ABSTRACT

A system for discovering, installing and using a printer device directly from a digital camera is provided. The system eliminates the use of a personal computer as an intermediary in printing images from a digital camera.

24 Claims, 5 Drawing Sheets

FIG. 4
(printer side)

FIG. 5

DYNAMIC PRINT DRIVER INSTALLATION ON CAMERAS

FIELD OF THE INVENTION

The invention relates to a system for discovering, installing and using a printer device directly from a digital camera.

BACKGROUND

Digital cameras are increasing in complexity, with features that resemble a personal computer (PC). Some digital cameras can run Linux®, and can have a file transfer protocol (FTP) service installed therein. These digital cameras can have an entire network stack present, support network communications for example internet protocol (IP) networking, and also potentially embedded flavors of Unix. However, unlike PCs, digital cameras seldom save software print drivers, as storage space is limited.

It is thus possible for digital cameras to be completely independent of computers as an intermediary to printing. Users may wish to print directly from their cameras to a printing device. These users can take their digital camera to a print kiosk such as in a mall, an office building printer, or a home printer, and print an image on a print device that may be completely unfamiliar to that specific digital camera. However, the software print drivers that enable the digital cameras to print to the print device must be readily available to be uploaded to the digital camera. Consequently, a mechanism for printing from a digital camera directly to a printer is desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

An approach is provided for allowing users to print digital images directly from a camera to a printer. A camera is configured with a discovery service that discovers available printers on a network. The camera is also configured with a print driver update manager that is configured to determine and obtain a particular print driver required for the camera to print digital images to a particular printing device. Embodiments of the invention also include a mechanism for deleting print drivers to free up space on the camera and a mechanism for automatically updating print drivers stored on the camera.

According to one aspect of the invention, a printer system comprises a discovery service located on the digital camera, for determining which of a plurality of printers are present and available to work with the digital camera; a discovery coordinator located on each of the plurality of printers, for being available to communicate their status with the discovery service; a print driver update manager located on the digital camera, for obtaining and storing print drivers; and a print driver update service located on a printer configured to, in response to the digital camera being connected to the printer system, select a particular print driver that is compatible with the digital camera, and assist in downloading the selected print driver to the digital camera.

According to another aspect of the invention, a method comprises a digital camera initiating a discovery process; a printer responding to the discovery process; the digital camera requesting information from the printer about the print driver; the printer responding with the requested information; the digital camera interpreting the information associated with the print driver; the digital camera requesting the print driver from the printer; and the printer sending the print driver to the digital camera.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are depicted in block diagram form in order to avoid unnecessarily obscuring the present invention.

In the following description, the various features of the invention are discussed under topic headings that appear in the following order:
GENERAL OVERVIEW
COMPONENTS OF SYSTEM
HOW THE SYSTEM COMMUNICATES
FROM THE DIGITAL CAMERA'S PERSPECTIVE
FROM THE PRINTER'S PERSPECTIVE
OVERVIEW OF HARDWARE AND OTHER FEATURES
DETAILS OF WEB SERVICES
EXPLANATION OF METADATA General Overview An approach is provided for allowing users to print digital images directly from a digital camera to a printer. A digital camera is configured with a discovery service that discovers available printers on a network. The digital camera is also configured with a print driver update manager that is configured to determine and obtain a particular print driver required for the digital camera to print digital images to a particular printing device. Embodiments of the invention also include a mechanism for deleting print drivers to free up space on the digital camera, and a mechanism for automatically updating print drivers stored on the digital camera.

Components of System

Figure 1:
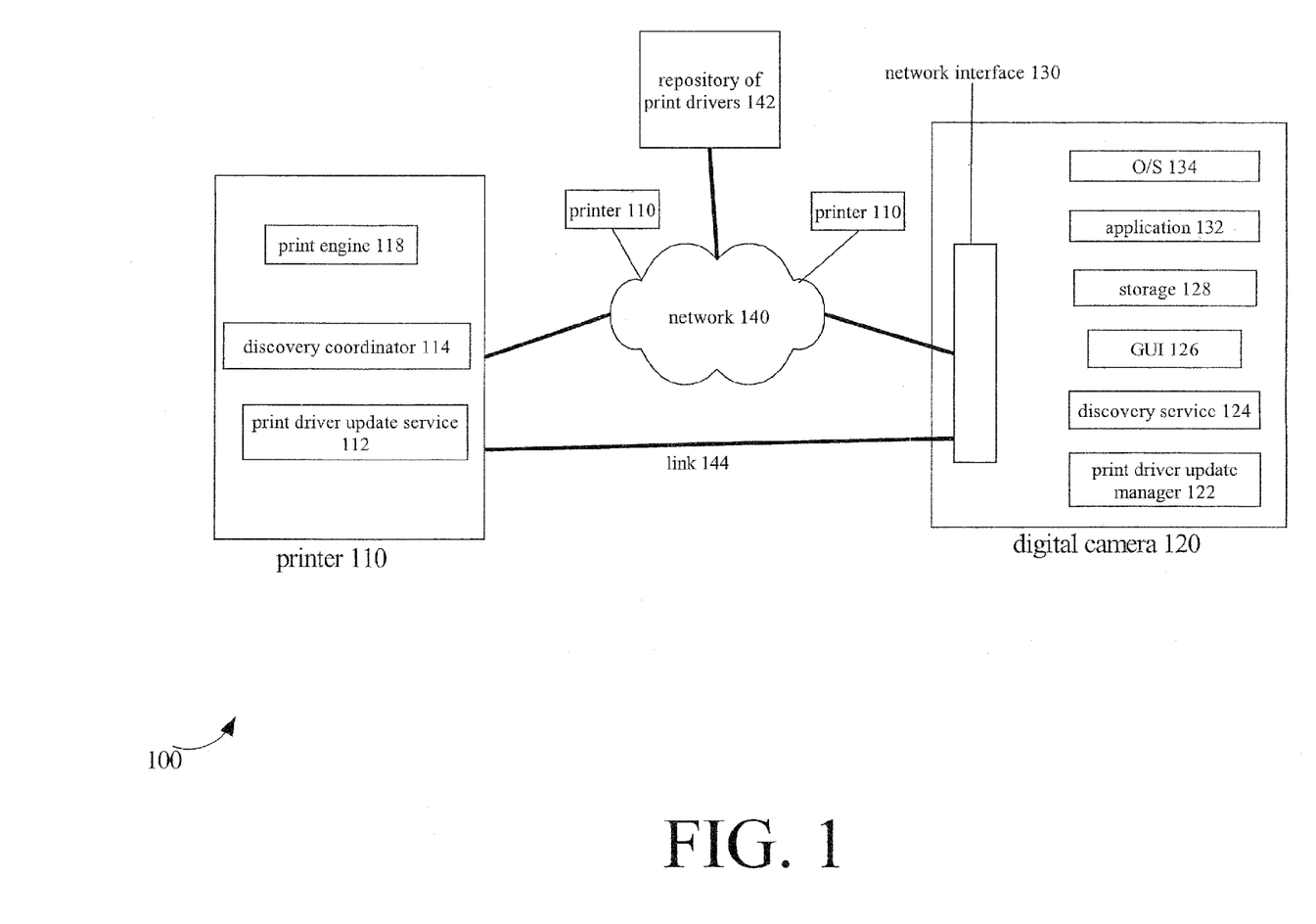
FIG. 1 is a block diagram that illustrates an example system for processing communications between a digital camera and a printer, according to an embodiment of the invention.

FIG. 1 depicts a system 100 that allows users to print digital images directly from a digital camera to a printer. The system 100 includes one or more printers 110 connected to a digital camera 120 through a network 140 or a link 144. Although the approach is depicted in FIG. 1 in the context of a digital camera 120 printing directly to a printer 110, the approach is not limited to the printer context and may be used with any device that has printing functionality, including for example, a multi-function peripheral (MFP). Thus, within this specification, references to printer 110 are for example purposes only.

Printer 110 is a printing device that is configured with a print driver update service 112 for managing print drivers, and a discovery coordinator 114 for responding to inquiries about status and capabilities of the printer 110. The printer 110 is also configured with a print engine 118 that generates printed versions of electronic documents including, for example, image data from the digital camera 120. Printer 110 may be configured with various other components and processes, depending upon a particular implementation, and is not limited to the components and processes depicted in FIG. 1.

The digital camera 120 is configured with a print driver update manager 122 for coordinating and managing print drivers, and a discovery service 124 for making determinations about available print devices. The digital camera 120 communicates with other devices on network 140 via a network interface 130, and displays information and accepts user input through a graphical user interface (GUI) 126. The digital camera 120 is configured with an application 132 for managing the printing process, as well as an operating system (O/S) 134. The print driver update manager 122 can store print drivers in storage 128, that may include volatile and non-volatile storage.

The network interface 130 may be any type of wired or wireless network interface. The digital camera 120 may also communicate directly with printer 110 via a link 144. The link 144 can be a wired (e.g. USB, FireWire™) or wireless (e.g. WiFi™) connection. Digital camera 120 may be configured with various other components and processes, depending upon a particular implementation, and is not limited to the components and processes depicted in FIG. 1.

FIG. 1 also shows a repository of print drivers 142, accessible to the various printers 110 and the digital camera 120 through the network 140. The repository of print drivers 142 may be a server, a database management system, or any type of network entity. The network 140 may be implemented by any medium or mechanism that provides for the exchange of data between printer 110, digital camera 120 and repository of print drivers 142. Examples of network 140 include, without limitation, a network such as a Local Area Network (LAN), Wide Area Network (WAN), Ethernet or the Internet, or one or more terrestrial, satellite or wireless links.

A print driver generally translates application data from a format supported by an application program into a format supported by a printing device. In doing so, the print driver may work in conjunction with the O/S 134 of the digital camera 120. In the present example, a print driver processes digital photo data from a format supported by the application 132 and generates print data that is in a format supported by printer 110.

A print driver typically contains at least two features, a rendering module and a GUI module. The print application 132 invokes the rendering module to transform the digital image data into specific target format of a printer 110 (also known as print data). After rendering, the print data is then sent to the print engine 118. The GUI module within a print driver is used to communicate the status and capabilities of a particular printer, as well as the status of a print task, to a user.

The printer 110 may have sufficient storage to contain print drivers for one or more digital cameras that it supports interaction with, or may instead store a pointer to a location on the network 140 where the print drivers are located. As depicted in FIG. 1, one possible location is the repository of print drivers 142.

The discovery service 124 has the ability to query either the network 140 or the link 144 for printers and other devices that the digital camera 120 may wish to interact with. The print driver update manager 122 determines whether the digital camera 120 has the necessary print driver to interact with a given printer and also determines whether the digital camera 120 needs to download a print driver or replace a current version of a print driver with a later version of the print driver. The print driver update manager 122 works in conjunction with the discovery service 124. The digital camera 120 can store print drivers in its storage 128, either persistently or temporarily.

Within the digital camera 120, the discovery service 124 initiates requests for information about available printers using either the network 140 or link 144. The discovery service 124 communicates with the various discovery coordinators 114 within the one or more printers 110, which are configured to respond to discovery requests from digital cameras. Using the discovery coordinator 114, the system 100 allows the digital camera 120 to discover a specific printer 110 either through the network 140 or through the link 144. The system 100 has access to print drivers through the network 140 and the repository of print drivers 142, but also can store those print drivers directly on the printer 110.

Most digital cameras 120 have some type of display and buttons, which assist in accessing the GUI 126 depicted in FIG. 1. The GUI 126 can be used to show a list of discovered printers potentially including a description of the printing mechanisms contained therein (for example, color/black and white, physical location, print-resolution (high/medium/low), type of paper available, other capabilities). As stated, many digital cameras have at least "OK", "Cancel" and scroll up/down buttons, as well as potentially many others. Those buttons can be used to make various user selections using the GUI 126.

The GUI 126 actuates the user's input to the digital camera 120, thereby enabling the exchange of information between a user and the digital camera 120. The GUI 126 may include display objects as well as one or more user interface controls. Using the data displayed through the GUI 126, a user can for example select a particular printer 110.

A typical printer 110 can have a multitude of print drivers loaded therein, although storage space is limited. As depicted in FIG. 1, the print driver update service 112 may also assist in finding print drivers by using the network 140, and potentially communicating with the repository of print drivers 142.

How the System Communicates

The digital camera 120 uses the discovery service 124 to discover printers within the network 140. Once a printer of interest is discovered, the discovery service 124 determines what (if any) version of a print driver is needed to enable the digital camera 120 to communicate with that printer. If the digital camera 120 does not have any version of a needed print driver, or does not have the correct version, the digital camera 120 can request the print driver from the printer 110. This request can be automatic, or can be triggered by the user through the GUI 126.

In the case where the digital camera 120 cannot discover a specific print driver, such as where the needed print driver is not present in the repository of print drivers 142, the system 100 can refer the user to a URL that points to print drivers.

Figure 2:
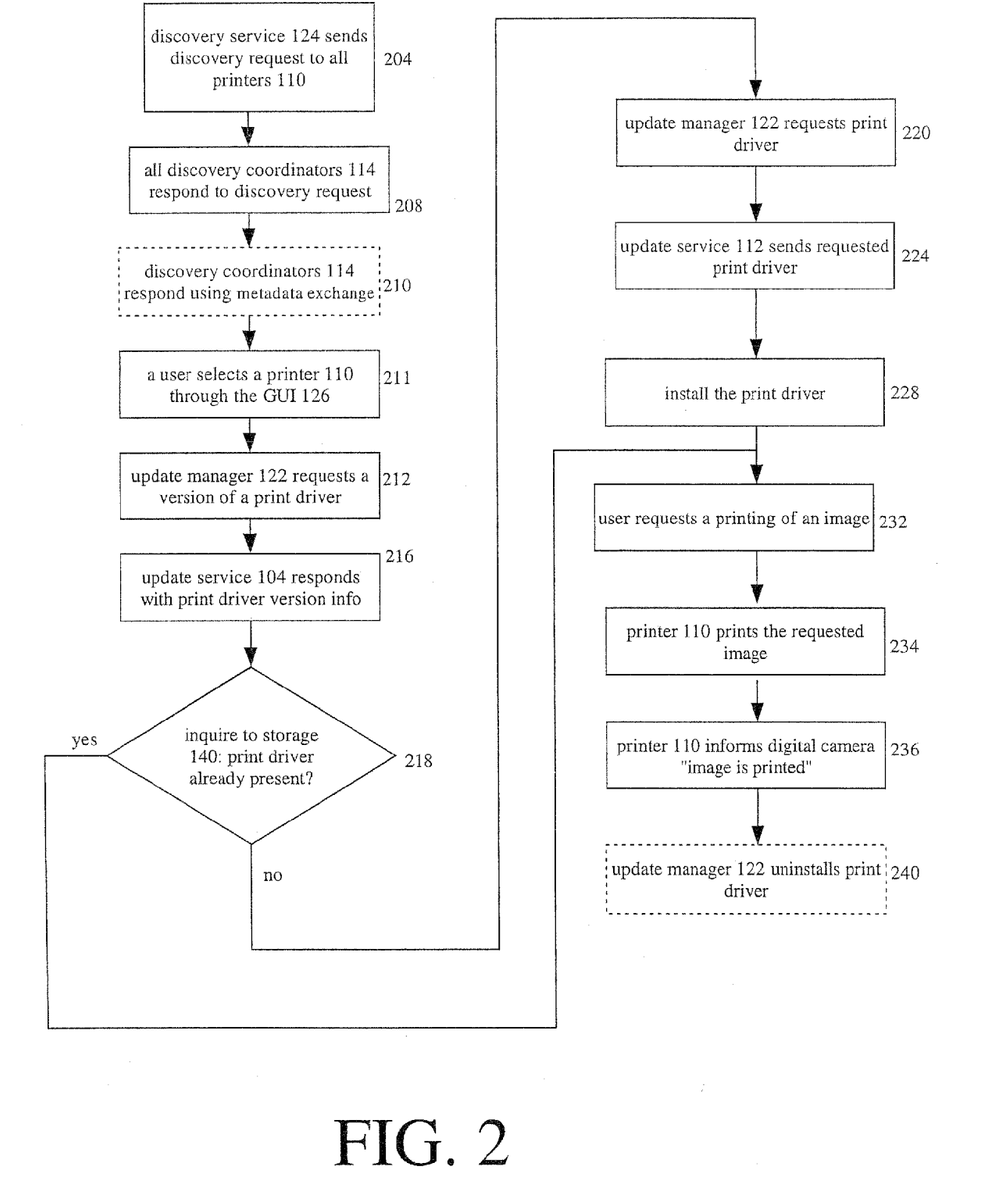
FIG. 2 is a flowchart illustrating various communication steps, according to an embodiment of the invention.

FIG. 2 is a flowchart depicting example communication steps between printer 110 and digital camera 120 according to an embodiment of the invention.

Within FIG. 2, at step 204 the discovery service 124 initiates a discovery request to all of the printers on network 140. For example, the discovery service 124 may generate and broadcast a request for available printing devices to identify themselves. As another example, in the context of Web Services, discovery service 124 may use a Web Services discovery mechanism. At step 208, the various discovery coordinators 114 respond to the discovery request to identify the printing devices that are available. In step 209, the discovery service 124 obtains information about the capabilities of the available printing devices. This may include the discovery service 124 making one or more requests for information to the discovered printing devices. As shown in step 210, within the context of Web Services, metadata exchange may optionally be used to obtain information about the capabilities of discovered printing devices. In Step 211, the digital camera 120 displays data on the GUI 126 that indicates the printing devices that are available to print the digital data.

At step 211, a user selects a printer through the GUI 126. For example, the user may use one or more interface controls provided on GUI 126 to select a particular printer from a list of printers. At step 212, the print driver update manager 122 requests data regarding the specific print driver needed. As stated, the data can be but not necessarily is in the form of metadata. This data can be important because often, print drivers are specific to a particular O/S within a digital camera, and are less dependent on the particular brand of digital camera 120. The print driver data can include but is not limited to whether color printing is possible or not, resolution (s) of the printer 110, type of paper available, and potentially other specific details. At step 216, the update service responds with the requested data.

At step 218, the digital camera 120 checks its own storage 128 to determine whether a version of the print driver is already present. Supposing no print driver is present, at step 220 the print driver update manager 122 requests the print driver, and at step 224 the print driver update service 112 sends to discovery service 124 either the print driver or a link to a location where the print driver may be obtained. At step 228, the digital camera 120 installs the print driver, potentially working with the O/S 134 installed thereupon.

At step 232, a user requests printing of an image. For example, the user may use one or more interface controls on GUI 126 to select a particular image for printing. In response to detecting user input indicating that a user desires to print the particular image, the digital camera 120 uses the driver to generate print data and the print data is transmitted to the printer 110. At step 234, the printer 110 prints the image and at step 236 informs the digital camera 120 that the image was printed. When printing is completed, at step 240 the print driver update manager 122 may optionally uninstall the print driver, for example, to save storage space on the digital camera 120. Step 240 is drawn in dashed lines because it is optional, as some users may not wish to uninstall the print driver. For example, supposing the digital camera 120 is used within a mall printing kiosk, the digital camera 120 would likely discard the print driver as repeated use is not expected in such an environment. The GUI 126 can prompt the user to make this choice.

From the Digital Camera's Perspective

Figure 3:
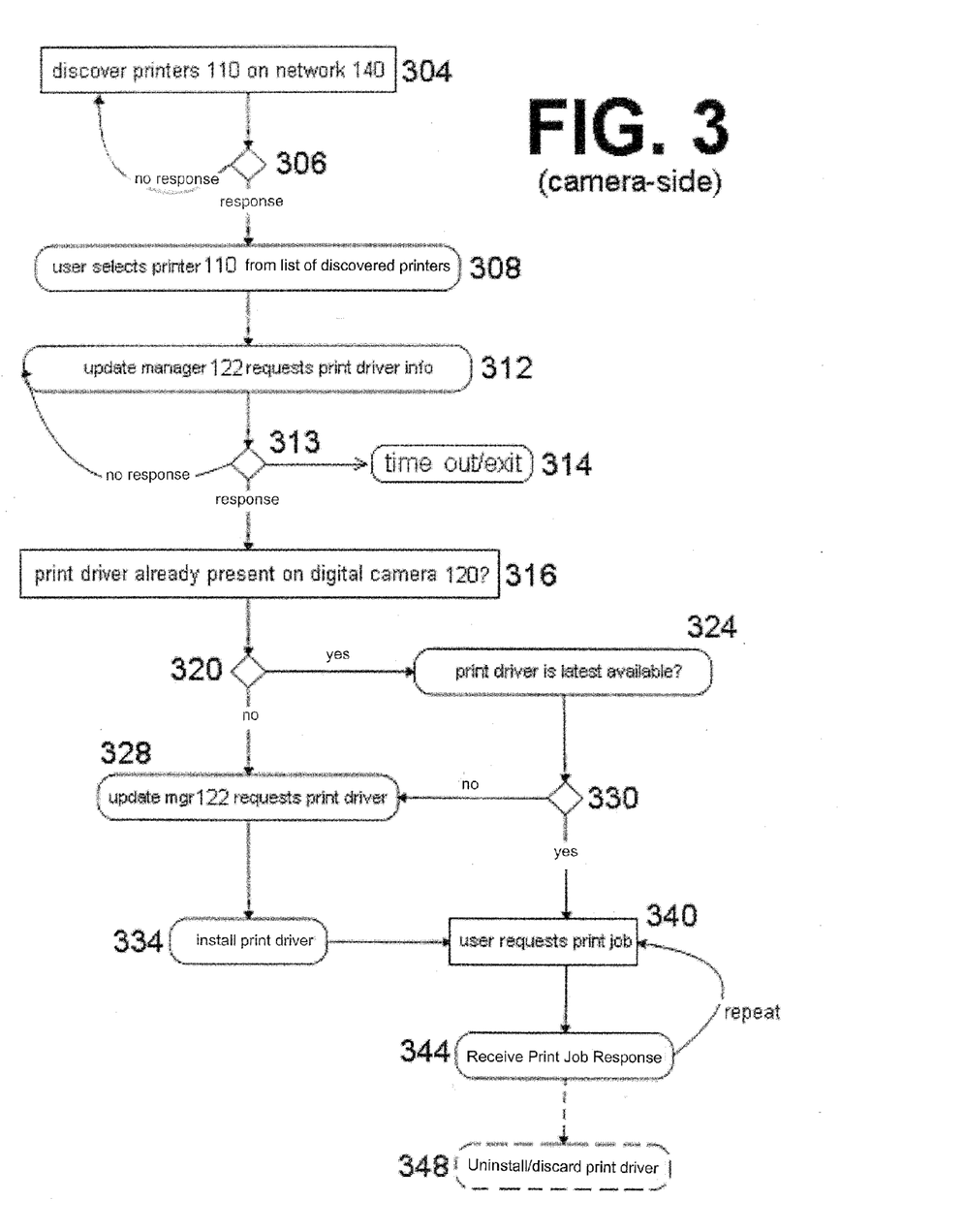
FIG. 3 is a flowchart of events that occur within an update manager on a digital camera, according to an embodiment of the invention.

FIG. 3 is a flowchart showing how a search for printers and print drivers could be part of startup when a digital camera 120 is first connected to the network 140 or link 144. This search could occur automatically, or could be triggered by a user through the GUI 126. When the search is completed, a list of available printers is provided to the user through the display of the digital camera 120.

At step 304, the print driver update manager 122 searches for all printers on the network 140. At step 306, if a response (e.g. step 208, FIG. 2) occurs, at step 308 the user selects a printer 110 from a list and the print driver update manager 122 requests print driver information for that printer at step 312. At step 313, the print driver update manager 122 waits for a response. After a specified amount of time, if no response arrives, the print driver update manager 122 times out and exits at step 314.

If the desired response arrives, at step 316 the print driver update manager 122 inquires whether the print driver is present on the digital camera 120. The response to this inquiry occurs at step 320. If a print driver is already present, at step 324 another inquiry is made as to whether the print driver is the latest available. If a print driver is not present, or if the print driver is not the latest (step 330) available, at step 328 the print driver update manager 122 requests the latest print driver. At step 334 the latest print driver is installed.

At step 340, a user request that a print job be printed and the print job is sent to printer 110 for printing. At step 344, a response from a printer is received. At step 348, the option of uninstalling the print driver is available.

The GUI 126 of the digital camera 120 needs to be sophisticated enough to be aware of different printers present. The digital camera 120 only sends a request for a print driver after checking the storage 128. If a print driver exists, but that print driver is not the latest version, then the print driver update manager 122 can request a later version, or prompt the user to make a decision using the GUI 126. The system 100 can also prompt the user to "keep or discard driver" using the GUI 126.

From the Printer's Perspective

Figure 4:
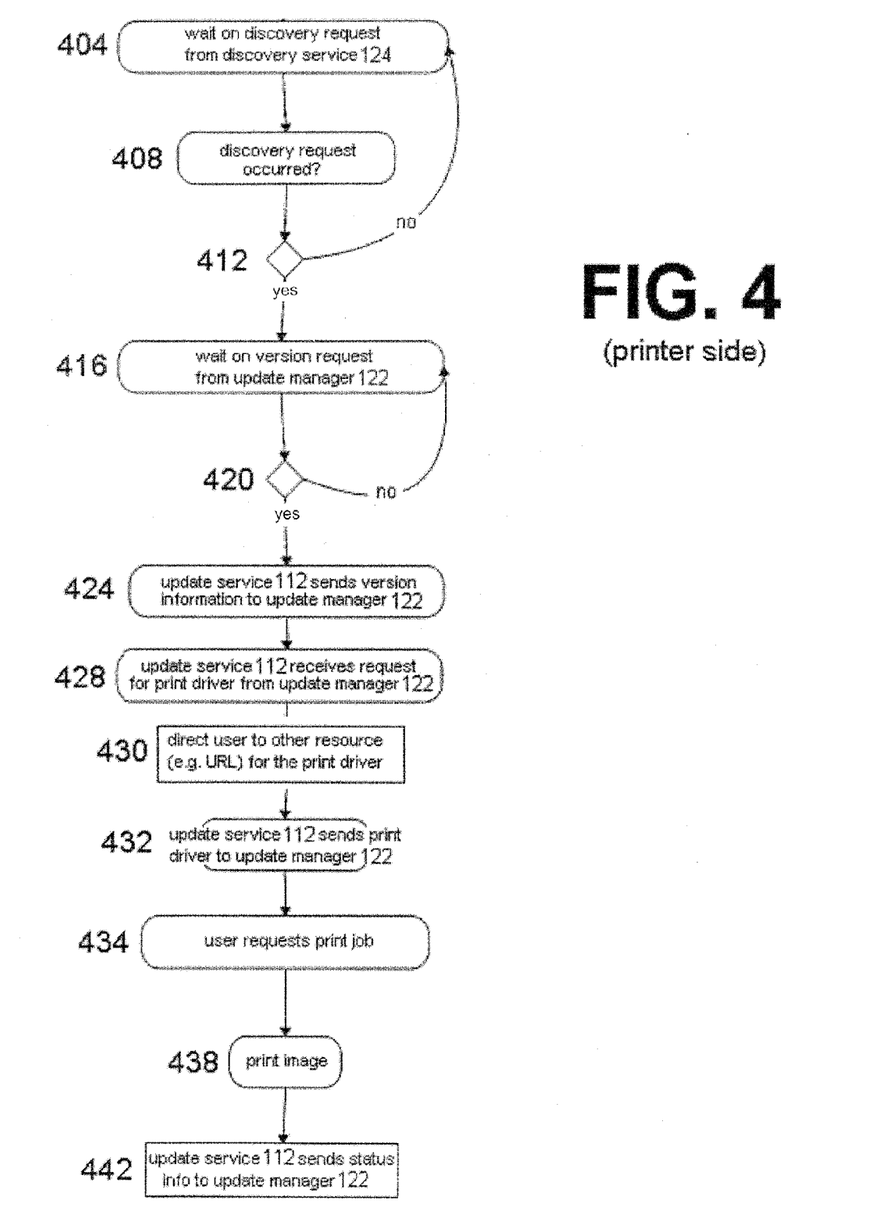
FIG. 4 is a flowchart of events that occur within an update service on a printer, according to an embodiment of the invention.

FIG. 4 is a flowchart showing the steps taken by the print driver update service 112 located on the printer 110. Initially, at step 404, the print driver update service 112 is idle, waiting for queries. At step 408 if a query is received, then at step 412 the print driver update service 112 advances to waiting on a request for version information at step 416. The print driver update service 112 waits on (step 416) a request for version information. When a request arrives (step 420), then the print driver update service 112 sends the version information (step 424). At step 428, the print driver update service 112 receives a request for and then sends (step 432) the print driver, if available on the printer 110. If the print driver is not available on printer 110, at step 430 the print driver update service 112 directs a user to how to find the print driver, for example by providing a uniform resource locator (URL) or other resource. If the print driver is not available, the steps complete without going any further.

At step 434, the print driver update service 112 receives a print request, and at step 438 prints the requested subject matter. At step 442, the print driver update service 112 informs the print driver update manager 122 of the status of the printing process.

As depicted in FIGS. 2 and 4, upon receiving a request from a digital camera 120, the printer 110 should always respond even if the printer 110 does not have the driver. As depicted in FIG. 3 at step 314, the digital camera 120 will time out after a set amount of time if no response arrives, and will either try again, or give up and potentially post a message to the user using the GUI 126.

Using the above information, the discovery service 124 can directly talk to the discovery coordinator 114 and get a description of the printer 110.

The system 100 thus simplifies the process of discovering, installing and using a printer device directly from a digital camera 120, and eliminates the use of a computer as an intermediary in printing.

Overview of Hardware and Other Features

Figure 5:
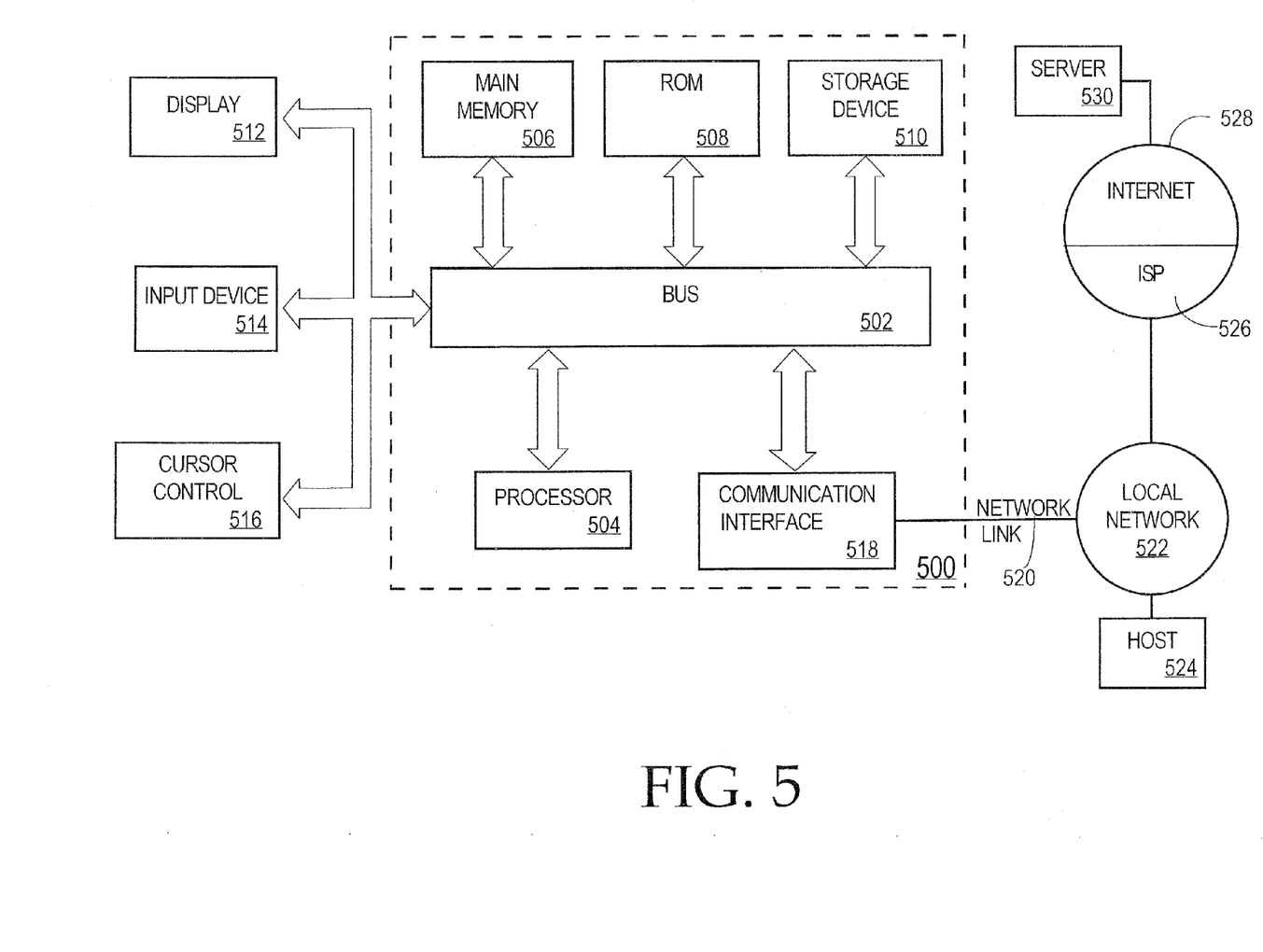
FIG. 5 is a block diagram that illustrates a computer system upon which an embodiment of the invention may be implemented.

The approach described herein for providing dynamic print driver installation on cameras may be implemented on any type of computing architecture or platform. For purposes of explanation, FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a machine to operation in a specific fashion. In an embodiment implemented using computer system 500, various computer-readable media are involved, for example, in providing instructions to processor 504 for execution. Such a medium may take many forms, including but not limited to non-volatile media and volatile media. Non-volatile media includes, for example, optical or magnetic disks, such as storage device 510. Volatile media includes, for example, dynamic memory, such as main memory 506.

Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of computer-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Details of Web Services

As stated, within the system 100, various communication protocols can be implemented using WS, although WS is not required and the system 100 should not be considered as limited exclusively thereto. The WS protocols are suitable for use with the system 100 because they define operations necessary for a print device (e.g. printer 110) to be discovered, installed, and used by a client device, in this case a digital camera 120. The WS protocols require that a WS device implement a discovery service, a metadata exchange service and an eventing service. WS thus includes a device profile, a print profile, and also a scan profile. Such features lend themselves well to use within the system 100. However, as stated, the system 100 can also be implemented without using WS.

Supposing that WS are enabled, examples of discovery and querying services used by the digital camera 120 could include WS_Discovery and WS_Metadata. These services could be used to find printers, multi-function peripherals (MFPs), or other devices that can print images or perform other useful interactions with the digital camera 120.

WS uses a protocol for exchanging XML-based messages over computer networks known as Simple Object Access Protocol (SOAP). Another usage of this acronym is Service Oriented Architecture Protocol. In either case, SOAP forms the foundation layer of the WS stack, providing a basic messaging framework that more abstract layers can build upon.

There are several different types of messaging patterns in SOAP, but the most common is the Remote Procedure Call (RPC) pattern, in which one network node (e.g. a digital camera) sends a request message to another node (e.g. an printer) and the server immediately sends a response message to the client.

Another WS category potentially useful with the system 100 is "Relationship", which describes the services hosted on that device, for example—a print service, a scan service, a fax service, etc. Metadata is exchanged through another WS protocol called WS-Transfer. There are many other information types called dialects that can be exchanged using a metadata exchange service.

Within the system 100, metadata exchange could conceivably involve the exchange of "This Device", "This Model", and "Relationship" information. The "ThisDevice" information contains the URL of the manufacturer of the printer 110 which the digital camera 120 can use to download the print driver if it is presently not available either on the printer 110 or within the network 140. The "ThisModel" information could contain the firmware version of the printer 110, which could allow the digital camera 120 to determine if updating a version of a print driver is necessary. The "Relationship" information will tell the digital camera 120 what services are hosted within a specific printer. For example, if an printer has a print service, then the "Relationship" information will contain the IP address and port at which that service can be reached.

Returning to FIG. 2, regarding the steps 208 "Discovery Response" and 212 "request Print Driver version", these requests can be for example formatted using a tagging system defined by the SOAP protocol. Regarding the steps 212 "request Print Driver version" and 216 "Metadata Response", the information exchanged therein is in the form of text strings that have tags embedded into them that provide the structure for how to read the text string.

Another way of utilizing WS protocols is in the area of communicating with all printers 110 present on the network 140. In such a case, the digital camera 120 can send a WS-Discovery probe message incorporating a multicast probe packet circulating through the network 140. The WS-Discovery probe message that will basically say that the sender (e.g. the digital camera 120) is looking for devices that support a print service. All printers that implemented WS-Discovery will have joined that multicast group address, and will then see that multicast probe packet. If a printer 110 supports a print service, that printer 110 can respond to the digital camera 120 with a ProbeResponse message. As stated, the same concept or principle can also be implemented in a non-WS capacity.

Supposing the system 100 uses WS protocols, the discovery service 124 can get information known as "DeviceID" which identifies what print driver the digital camera 120 needs. Continuing the example where WS protocols are used, during the initial discovery process, the menuing logic within the GUI 126 could have a "Setup" menu that has a "Network Setup" sub-menu, which could in turn give rise to a "Printer Discovery" sub-menu. The "printer Discovery" sub-menu could start the process of installing a printer, with pop up windows to allow further interaction with the user. However, these features could also be implemented without using WS protocols.

Explanation of Metadata

Various portions of the system 100 can be implemented using Web Services (WS) protocols, although these are not required. Nonetheless, regardless of whether WS are used or not, various components within the system 100 can communicate using metadata. Such metadata can for example contain a description of the printer 110 including a category ("dialect" if WS protocols are used) called "ThisModel", which describes the type of model name, model number, and manufacturer of the device. Another category included is "ThisDevice", which describes information specific to that device, for example—device name, firmware version, serial number, etc. If using WS, a printer 110 should have a metadata section with its Dialect equal to http://schemas.xml-soap.org/ws/2006/02/devprof/ThisDevice. An example follows.

```
<wdsp:ThisDevice...>
    <wdsp:FriendlyName xml:lang="...">?
    xs:string</wdsp:FriendlyName>+
    <wdsp:FirmwareVersion>xs:string</wdsp:FirmwareVersion>?
    <wdsp:SerialNumber>xs:string</wdsp:SerialNumber>?
    ...
</wdsp:ThisDevice>
```

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A digital camera comprising:
  a discovery service configured to:
    discover a particular printer that is available to the digital camera for printing,
    request metadata that comprises a particular version of a particular print driver that is needed to print to the particular printer; and
  a print driver update manager configured to:
    determine, based upon the metadata, that the particular version of the particular print driver is needed to print to the particular printer,
    determine whether the particular version of the particular print driver is currently stored on the digital camera, and
    in response to determining that the particular version of the particular print driver is not currently stored on the digital camera, request and retrieve the particular version of the particular print driver, and install the particular version of the particular print driver on the digital camera.

2. The digital camera of claim 1, wherein the print driver update manager is further configured to select the particular version of the particular print driver that is compatible with the digital camera, and to assist in downloading the selected particular version of the particular print driver to the digital camera.

3. The digital camera as recited in claim 1, wherein the print driver update manager is further configured to cause at least a portion of the particular version of the particular print driver to be stored in a persistent storage within the digital camera.

4. The digital camera as recited in claim 1, wherein the print driver update manager is further configured to cause the at least a portion of the particular version of the particular print driver stored in a storage in the digital camera to be deleted from the storage in the digital camera.

5. The digital camera as recited in claim 1, wherein the print driver update manager is further configured to notify a user of the existence of a more recent version of the particular print driver that is currently installed on the digital camera.

6. The digital camera as recited in claim 5, wherein the print driver update manager is further configured to automatically install the more recent version of the particular print driver than is currently installed.

7. The digital camera as recited in claim 1, wherein the print driver update manager is further configured to cause a graphical user interface to be displayed on the digital camera that allows a user to select the particular version of the particular print driver from a list of print drivers.

8. A non-transitory computer-readable storage medium storing instructions which, when processed by one or more processors of a digital camera, cause the one or more processors to perform the following steps:
   discovering a particular printer that is available to the digital camera for printing;
   requesting metadata that comprises a particular version of a particular print driver that is needed to print to the particular printer;
   determining, based upon the metadata, that the particular version of the particular print driver is needed to print to the particular printer;
   determining whether the particular version of the particular print driver is currently stored on the digital camera; and
   in response to determining that the particular version of the particular print driver is not currently stored on the digital camera, requesting and retrieving the particular version of the particular print driver, and installing the particular version of the particular print driver on the digital camera.

9. The non-transitory computer readable storage medium of claim 8, further storing instructions which, when processed by the one or more processors, cause initiating a discovery process.

10. The non-transitory computer readable storage medium of claim 8, further storing instructions which, when processed by the one or more processors, cause: receiving the requested metadata.

11. The non-transitory computer readable storage medium of claim 8, further storing instructions which, when processed by the one or more processors, cause: requesting the particular version of the particular print driver from the particular printer.

12. The non-transitory computer readable storage medium of claim 8, further storing instructions which, when processed by the one or more processors, cause: receiving the particular version of the particular print driver.

13. The non-transitory computer readable storage medium of claim 11, further storing instructions which, when processed by the one or more processors, cause uninstalling the particular version of the particular print driver.

14. The non-transitory computer readable storage medium of claim 8, further storing instructions which, when processed by the one or more processors, cause prompting a user to select the particular printer from a plurality of printers.

15. A method, comprising:
    receiving, at a server, metadata that comprises a particular version of a particular print driver that a digital camera needs to print to a particular printer;
    based upon the metadata, determining, at the server, that the particular version of the particular print driver is needed to print to the particular printer;
    determining, at the server, whether the particular version of the particular print driver is currently stored on the digital camera, and
    in response to determining, at the server, that the particular version of the particular print driver is not currently stored on the digital camera, providing the particular version of the particular print driver to the digital camera;
    wherein the method is performed by one or more computing devices.

16. The method of claim 15, wherein providing the particular version of the particular print driver comprises providing the particular version of the particular print driver to the digital camera from the particular printer.

17. The method of claim 15, wherein providing the particular version of the particular print driver comprises providing the particular version of the particular print driver to the digital camera from the server.

18. The method of claim 15, further comprising:
    requesting the particular version of the particular print driver from the particular printer.

19. The method of claim 15, further comprising:
    receiving the particular version of the particular print driver from the particular printer.

20. The method of claim 15, further comprising:
    prior to providing the particular version of the particular print driver to the digital camera, checking a persistent storage area within the digital camera for the particular version of the particular print driver.

21. The method of claim 20, further comprising:
    in response to determining that the particular version of the particular print driver is stored in the persistent storage area of the digital camera, but the particular version of the particular print driver is not a latest version of the particular print driver, providing the latest version of the particular print driver.

22. The method of claim 15, further comprising:
    prompting a user to select the particular printer from a plurality of printers.

23. The method of claim 15, further comprising:
    prompting a user to select the particular version of the particular print driver from a plurality of print drivers.

24. The method of claim 15, further comprising:
    prompting a user to keep or discard the particular version of the particular print driver.

* * * * *